April 16, 1963
K. F. GRIFFITHS
3,085,871
METHOD FOR PRODUCING THE REFRACTORY METALS
HAFNIUM, TITANIUM, VANADIUM, SILICON,
ZIRCONIUM, THORIUM, COLUMBIUM
AND CHROMIUM
Filed Feb. 24, 1958
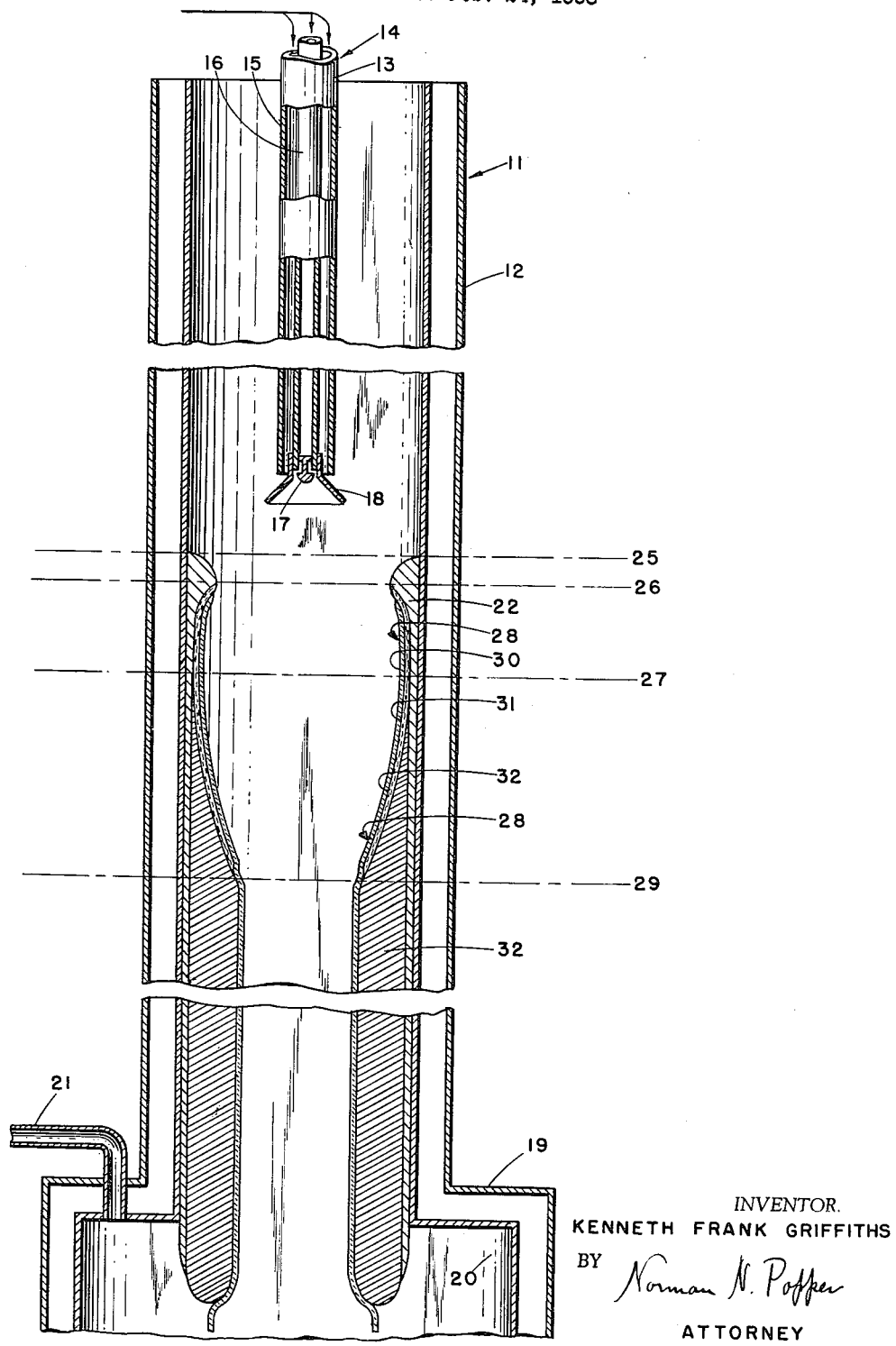
INVENTOR.
KENNETH FRANK GRIFFITHS
BY Norman N. Popper
ATTORNEY 3,085,871
METHOD FOR PRODUCING THE REFRACTORY METALS HAFNIUM, TITANIUM, VANADIUM, SILICON, ZIRCONIUM, THORIUM, COLUMBIUM, AND CHROMIUM
Kenneth Frank Griffiths, 47 Branch Brook Place, Newark, N.J.
Filed Feb. 24, 1958, Ser. No. 717,176
7 Claims. (Cl. 75—84.1)

This invention relates to the production of the refractory metals, hafnium, titanium, vanadium, silicon, thorium, columbium, and chromium and is a continuation in part of patent application 499,750, now abandoned, filed in the United States Patent Office April 6, 1955, patent application 632,549, now abandoned, filed in the United States Patent Office on January 4, 1957, and patent application 697,321, now abandoned, filed in the United States Patent Office on November 19, 1957.

Specifically, my present invention relates to an improved liquid phase process for producing the refractory metals: titanium, vanadium, silicon, hafnium, zirconium, thorium, columbium, and chromium by the reduction of a halide of the desired metal product with a suitable reducing agent in an atmosphere rich in either metal product halide gas, reducing agent gas, or some suitable inert gas.

It is among the objects of my invention to produce a refractory metal by reacting a halide of the refractory metal with a suitable reducing agent in an atmosphere which is predominantly either metal product halide gas, reducing agent gas, or inert gas.

Another object is to separate the reaction products as they are in a molten film which overlies a lining of frozen metal product.

Still another object of my invention is to freeze the metal product formed in the reaction in a continuous, homogeneous, solid metal product pipe.

A further object of my invention is to produce the metal product in the form of homogeneous pipe so that it may be fed directly into machinery suitable for the production of useful mill products.

A still further object of my invention is to condense any reducing agent halide gas produced, in the reaction chamber and at a temperature higher than the melting point of the metal product, such that all the reducing agent halide leaves the reaction chamber in the liquid phase.

An additional object of my invention is to completely separate all of the reaction products within the reaction chamber.

Another object of my invention is to reduce a maximum amount of the metal product halide to the metal product.

A still further object of my invention is to produce both the metal product and the reducing agent halide in the liquid phase by maintaining proper conditions of temperature and pressure within the reaction chamber.

These objects and advantages may be achieved by my improved liquid phase process, in which metal product halide is reacted with a stream of reducing agent in a reaction chamber whose walls are cooled by a suitable coolant circulating therein and under the following general conditions:

(1) The exothermic heat of reaction is sufficient to produce the metal product in the liquid phase and to maintain a two component flowing film of metal product and reducing agent halide on a lining of frozen metal product which builds up on the chilled walls of the reaction chamber at or near the reaction zone.

(2) The reaction zone pressure is such that the partial pressure of the reducing agent halide gas present is higher than its vapor pressure at the temperature of the melting point of the metal product.

(3) Most of the reaction products are collected on the flowing molten, metal product film while in the liquid phase.

(4) Immediately upon collecting on the molten film, the metal product consolidates within the film by a process which I prefer to call a liquid-phase-film-separation whereby the metal product is left free of molten reducing agent halide.

(5) All of the metal product, which impinges and collects on the molten film, is frozen to and consolidates with the lining of solid metal product which underlies the film.

(6) The walls of the reaction chamber are maintained at a sufficiently low temperature to prevent the metal product sponge lining building thereon from forming a highly adhesive bond therewith.

(7) A continuous pipe of metal product is formed by either moving the reaction zone upwardly or by maintaining the reaction zone in a stationary position but withdrawing the continuously forming metal product lining downwardly from the reaction zone.

(8) Whether the reaction zone is moved upwardly or the metal product pipe is withdrawn downwardly, the metal product pipe is formed at the same rate as the relative movement of the reaction zone.

(9) Molten reducing agent halide flows down the core of the metal product pipe and is discharged into a suitable collection chamber lying below the reaction chamber.

*Choice of Reactants*

A combination of a reducing agent and of a metal product halide must be chosen which will react to form a reducing agent halide whose critical temperature is higher than the melting point of the metal product. It is preferable to choose a combination which will be productive of a reducing agent halide which has the lowest possible vapor pressure at the melting point of the metal product so that the process may be carried out at the lowest possible pressure. Moreover, it is desirable that the reducing agent halide have a vapor pressure substantially below the vapor pressure of the reducing agent in order that condensation of the reducing agent within the reaction zone may be minimized. In general, the reactants should have the following characteristics:

*Reducing Agent*

(1) Low melting point to facilitate its introduction into the reaction chamber at a controlled flow rate.

(2) High vapor pressure to prevent its condensation within the reaction zone which would cause alloying with the metal product.

(3) Be productive of halides with a low vapor pressure at the melting point of the metal product to minimize the necessary reaction pressure.

(4) Have a low equivalent weight to minimize the weight necessary to produce a given weight of metal product.

(5) Be productive of halides which are stable at the high temperatures employed in the reaction zone in order that the reaction may go to completion with the reducing agent halide being condensed at a temperature higher than the melting point of the metal product.

(6) Have a generally low cost.

With these factors in mind, I find that lithium, sodium, potassium, rubidium, cesium, magnesium, and calcium, are suitable reducing agents. Among these, sodium is the preferred reducing agent.

Metal Product Halide (1) It should be able to exist in either the liquid or gas phase at the lowest possible temperature so as to facilitate its introduction into the reaction chamber at a controlled rate.

(2) It must form a reducing agent halide with the lowest possible vapor pressure and with a critical temperature higher than the melting point of the metal product. In these respects generally, the lower the atomic weight of the halogen the better.

With these factors in mind, any metal product halide is suitable which will be productive of a reducing agent halide whose critical temperature is higher than the melting point of the metal product.

Reaction Zone Pressure

The pressure in the reaction chamber is most critical to my present invention. Since I have postulated a liquid phase reaction, the pressure must be maintained sufficiently high to permit the reducing agent halide gas present to condense at a temperature higher than the melting point of the metal product. On an ideal basis, if the gas in the reaction zone were comprised of 100% reducing agent halide, the lowest allowable pressure would be equal to the vapor pressure of the reducing agent halide at the melting point of the metal product. However, the composition of the atmosphere in the reaction zone may vary widely according to whether the reaction is carried out in a metal product halide rich atmosphere, a reducing agent rich atmosphere, or an inert atmosphere. Experience has shown that always, there is considerably more than merely reducing agent halide gas present. There are present other substances such as lower halides of the metal product, gaseous reducing agent, and gaseous metal product tetrahalide, as well as others. Thus, the actual allowable minimum reaction pressure is somewhat higher than the vapor pressure of the reducing agent halide at the melting point of the metal product, it being equal to that reaction zone pressure which will permit of a reducing agent halide partial pressure at least equal to and preferably greater than the vapor pressure of such reducing agent halide gas at the melting point of the metal product. Such a reducing agent halide partial pressure is necessary in order that the reducing agent halide will condense at a temperature at least as high as the melting point of the metal product.

It is desirable to produce the metal product as free as possible from dissolved reducing agent. Therefore, the reaction pressure should be maintained sufficiently low to reduce to a minimum the amount of reducing agent the metal product is able to dissolve; the higher the pressure the more the reducing agent that may dissolve in the metal product. If reducing agent freezes with the metal product, it is difficult to remove and its presence constitutes a contaminant.

Composition of the Atmosphere in and Surrounding the Reaction Zone

The composition of the atmosphere in and immediately surrounding the reaction zone may vary widely depending upon conditions of temperature and pressure as well as the relative concentrations of the input reactants. Usually, the atmosphere contains a partial pressure of each reactant, each reaction product, and any stable intermediate reaction products which may form. In some cases, inert gas may be present either because it has been put there intentionally or because it has defused from the collection chamber. However, it is most important that the partial pressure of the reducing agent halide be higher than its partial pressure at the melting point of the metal product otherwise the reducing agent halide will not form in the liquid phase. The ratio of the partial pressure of the reducing agent to metal product halide is not critical to my present invention. Thus, the reaction zone may be rich in either reducing agent gas or metal product halide gas. I prefer that partial pressure of the reducing agent halide gas to be as near the total pressure as possible such that the lowest possible reaction pressure may be employed.

Reaction Zone Temperature

Since my invention postulates producing the metal product in the liquid phase, it is necessary to maintain the reaction temperature above the melting point of the metal product. Such a temperature may be maintained by providing conditions such that the partial pressure of the reducing agent halide within the reaction zone is maintained at least as high as the vapor pressure of the reducing agent halide at the melting point of the metal product. Such a partial pressure may be maintained by the proper control of the input temperature of the reactants to the reaction zone, the control of the rate of heat loss from the reaction zone, and the control of the total pressure of the reaction zone. When at least some of the reducing agent halide is being produced in the liquid phase in the reaction zone, the temperature of the reaction zone is equal to the temperature at which the reducing agent halide vapor is in equilibrium with the reducing agent halide liquid in the reaction zone.

Generally, the reaction chamber is not provided with a metal product lining prior to each run. However, the reaction chamber walls are protected from the extreme temperatures of the reaction and the reaction products impinging thereon by a lining of crude metal product sponge which immediately forms adjacent to the reaction zone. The metal product sponge lining forms from the reaction of the input reactants at a temperature below the melting point of the metal product near the drastically chilled walls of the reaction chamber. Gradually, the sponge lining thickens until its thermal insulation properties cause its inner surface adjacent to the reaction zone to become molten.

The reaction chamber walls are maintained at a temperature far below the melting point of the metal product in order to prevent a highly adhesive bond between the lining and the walls. In order that the pipe may be withdrawn from the reaction chamber with relative ease, it is most important to prevent an adhesive bond between the walls and the lining.

The reaction chamber walls may be maintained at the desirable temperature by means of a circulating coolant in passages in the walls. It is preferable that the reaction chamber walls be fabricated from a metal such as copper which has a high coefficient of thermal conductivity.

The exposed, inner surface of the metal product lining is covered with two immiscible, molten, flowing films of reaction products. As reaction products impinge on the film, the metal product immediately consolidates to form a lower film, leaving the reducing agent to form an overlying film. This separation is due to the extremely high surface tension of the molten metal product. I call this process of separation a liquid-phase-film-separation.

Final Form of the Metal Product

As the reaction proceeds, molten metal product, from the metal product film, freezes at the same rate that molten metal product is added to the film by the reaction, thus achieving a steady state operating condition. That area of the molten metal product film where metal product is freezing I shall call the freezing area. Generally, it is below the point where molten metal product impinges on the film. If metal product is added to the film at a greater rate than it is freezing from it, the excess metal product will run down the lining and increase the size of the freezing area. Conversely, if molten metal product is added at a slower rate than it is freezing, the size of the freezing area will decrease.

In my present invention, I prefer to produce the metal product in a pure, solid, sound cast shape. This may be done by maintaining the exposed surface of the metal product film at a higher temperature than the melting point of the metal product. Thus, the metal product molten film freezes from the solid metal product lining outwardly, producing a sound casting. The overlying film of molten reducing agent halide, has a temperature above the melting point of the metal product and thus maintains the upper surface of the metal product film at a temperature higher than its melting point. In this manner, no heat is dissipated from the upper surface of the metal product film, thus, the freezing of the metal product occurs exclusively at the interface between the molten metal product film and the solid sponge lining. If freezing occurs at the upper surface of the metal product lining, which is the interface between the molten metal product film and the molten reducing agent halide film, the metal product would freeze in the same manner as wax running down the sides of a candle forming a non-homogeneous pipe. Such a condition is undesirable and should be avoided by maintaining the upper surface of the metal product film at a temperature higher than the melting point of the metal product.

The heat of fusion of the metal product represents the difference between the rate of heat loss from the film to the lining and the rate of heat input at the surface of the film. Thus, the rate of freezing per unit area of the metal product film is proportional to the difference between rate of heat input and the rate of heat loss from the film.

In order to form a lengthening sound cast pipe, the reaction zone is simply withdrawn upwardly as the film of metal product freezes. The thickness of the pipe may be controlled by the rate at which metal product is added to the film and the rate at which the reaction zone is withdrawn upwardly.

My process may be carried out in an apparatus such as that shown in the drawing in which The FIGURE on the drawing is a vertical, sectional view showing the reaction chamber and part of the collection chamber.

Referring to the drawing in detail, my apparatus consists of a cylindrical reaction chamber 11, which is provided with an external jacket 12 through which flows a coolant. The top of the reaction chamber is closed except for a circular opening 13 through which projects a reactant input nozzle 14. The nozzle 14 is comprised of two concentric conduits 15 and 16 and is movable along the central axis of the reaction chamber 11. The outer conduit 15 is connected to a source of supply of either liquid or gaseous metal product halide whereas the inner conduit 16 is connected to a source of supply of liquid or gaseous reducing agent. The end of the inner conduit 16 is provided with a spray nozzle 17. A deflector 18 is attached to the end of the outer conduit 16 which directs the metal product halide in a conical spray towards the walls of the reaction chamber while mixing with the spray of reducing agent emanating from the spray nozzle 17. The coolant jacket 12 which surrounds the reaction chamber 11 connects to a similar coolant jacket 19 which surrounds the collection chamber 20. The collection chamber lies below the reaction chamber 11 and is concentric therewith. The collection chamber is suplied with inert gas which passes through the pipe 21.

In operation, liquid or gaseous metal product halide and reducing agent are passed through the conduits 15 and 16 when the input nozzle 14 is near the bottom of the reaction chamber 11. A flame-type reaction occurs spontaneously forming metal product and reducing agent halide. By reason of the spray nozzle 17 and the deflector 18, the reaction products impinge on the reaction chamber walls. Since the reaction chamber walls are drastically cooled, the reaction which occurs near them takes place at a temperature below the melting point of the metal product thus forming a lining of metal product sponge 22 which lightly adheres to the reaction chamber walls. The sponge lining 22 increases in thickness between levels 25 and 26. Most of the reaction occurs at level 27 and therefore the heat is most intense at this level. The sponge lining therefore melts and decreases in thickness between levels 26 and 27 reaching a minimum thickness at level 27. Molten reaction products impinge on the lining forming a two-component, molten, flowing film 28 which overlies the sponge lining between levels 26 and 27. The film, 28, is comprised of an overlying film of reducing agent halide 30, and an underlying film of pure metal product 31. As the film 28 flows downwardly and away from the level 27 where the heat of the reaction is most intense, the metal product consolidates into the underlying film 31 and this film then freezes from the interface of the sponge lining 22 outwardly towards the interface of the metal product film and the reducing agent halide film. Thus, there is formed a solid, homogeneous cast pipe 32 of pure metal product. It is most important that the direction of heat flow from the metal product film between levels 27 and 29, where all the metal product film freezes, be in the direction outwardly from the sponge lining 22. Otherwise, freezing might occur on the interface of the metal product film and the reducing agent halide film producing a non-homogeneous solid much in the manner of candle wax drippings flowing down the side of a candle. Of course, as the reactant input nozzle 14 is withdrawn upwardly, the various levels mentioned above move upwardly too. Thus, a solid, homogeneous cast pipe 32 of pure metal product is formed from the bottom of the reaction chamber upwardly. The maximum thickness of the pipe 32 is reached at level 29 at which level all of the metal product film 31 has frozen to form the cast pipe 32.

It is the relative motion of the reaction zone and the solid cast pipe that is important and not the absolute motion of the reaction input nozzle 14. Thus, the input nozzle may be held stationary, and the solid cast pipe removed downwardly to maintain the relative motion between the reaction zone and the pipe. The withdrawal of the pipe downwardly is made possible by the fact that the overlying metal product sponge 22 adhered only lightly to the walls of the reaction chamber. The withdrawal may be accomplished by any one of a number of well-known mechanical systems and need not be detailed in this application.

*Example 1.*—In the production of titanium pipe, an apparatus such as that shown in the drawings may be used. The reaction chamber has an internal diameter of 14.56 cm. and a height of 6 meters. The collection chamber is 122 cm. in internal diameter and 183 cm. deep. The walls of both the reaction chamber and the collection chamber are formed of nickel plated copper and are provided with internal jackets for the passage of a coolant.

At the start, all the air in both the reaction chamber and the collection chamber is pumped out and replaced by helium at approximately 9 atmospheres. The lowermost portion of the input nozzle is positioned approximately 5 meters below the top of the reaction chamber, and water is then circulated through the cooling jackets in the walls of both chambers. The reactants are then introduced through a proportioning pump which delivers approximately one mole per second of liquid titanium tetrachloride and 4 moles per second of liquid sodium to the input nozzle, at approximately 120° C. A spontaneous flame type reaction occurs below the input nozzle and begins the deposit on the chilled walls of the reaction chamber at about the level of the reaction zone. This sponge lining built in thickness until its thermal insulating ability permits its exposed inner surface to become molten. Two minutes after the start of the reaction, the input nozzle is withdrawn upwardly at the rate of 1/10 cm. per second while the flow rate of the reactants is maintained constant at the beginning rate. The pressure within both the reaction chamber and the collection chamber is maintained constant at 9 atmospheres throughout the reaction.

As the input nozzle is withdrawn upwardly, a solid, homogeneous pipe of titanium forms in the manner above described. The molten sodium chloride which has separated from the molten titanium, flows downwardly over the inner surface of the solid titanium pipe and into the collection chamber. In this way, approximately 234 grams per second of molten sodium chloride are formed. Also, approximately 410 grams per centimeter of pipe length of titanium and 23 grams of titanium sponge are produced. During the course of a run, the input nozzle is withdrawn upwardly for a distance of 408 cm. in 68 minutes. On the basis of theoretical calculations, the titanium pipe produced in this example is covered with a lining of crude titanium sponge about 0.318 cm. thick. The thickness of this sponge layer is inversely proportional to the thermal flux maintained at the level of the hottest portion of the reaction zone and directly proportional to the temperature drop across it at the same level. Thus, if the thermal conductivity of the crude sponge lining is assumed to be 0.013 cal./cm.$^2$-sec.-° C. the temperature drop across the lining is 1500° C., and the thermal flux therethrough is 61.2 cal./cm.$^2$-sec., the thickness of the sponge lining should be the 0.318 cm. postulated. The outside diameter of the entire pipe is about 13.9 cm. and the internal diameter is postulated as being 8.9 cm. giving an average wall thickness of about 2.5 cm. Theoretically, there will be produced 983 kilograms of molten salt and 210 kilograms of titanium distributed in both the pure portion of the pipe and in the sponge lining in the above-mentioned proportions. After the 70 minute run has been completed, the reactant input is shut off and the pressure reduced to atmospheric. The molten salt is drained from the bottom of the collection chamber while the helium in the collection chamber is maintained at atmospheric pressure. The titanium pipe is cooled for two hours after which time it has shrunk sufficiently to be easily withdrawn through the top of the reaction chamber.

In practice, a thin layer of titanium sponge may form on the exposed inner surface of the titanium pipe due to some titanium precipitating out of solution from the molten sodium chloride flowing over it.

*Example 2.*—In this example, a length of zirconium pipe is formed by the reaction of zirconium tetrachloride with sodium. The apparatus is the same as that employed in Example 1. However, the zirconium is introduced in the form of zirconium tetrachloride gas at 500° C. and the sodium is preheated to the temperature as well. The initial procedure is the same as in Example 1 but the reaction and collection chamber pressure is 20 atmospheres instead of 9. One mole per second of zirconium tetrachloride and 4 moles per second of sodium are reacted for a period of 53 minutes. The withdrawal rate of the input nozzle is 0.133 cm. per second with the total distance traversed 408 cm. The dimensions of the pipe are approximately those of Example 1. Approximately 290 kilograms of zirconium and 745 kilograms of salt are formed, most of the zirconium being recovered in the form of pure pipe.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention; these substitutes are contemplated as being within the scope of the appended claims, although they are not specifically catalogued herein.

I claim:

1. The method of producing pure refractory metals selected from the group consisting of titanium, hafnium, vanadium, silicon, zirconium, thorium, columbium, and chromium comprising introducing into a reaction chamber a dispersed stream of a liquid reducing agent selected from the group consisting of lithium, sodium, potassium, rubidium, cesium, magnesium, and calcium; simultaneously introducing into the reaction chamber a dispersed stream of a liquid halide of a desired metal product selected from the group consisting of titanium, hafnium, vanadium, silicon, zirconium, thorium, columbium, and chromium to produce a dispersed stream of liquid metal product and a liquid reducing agent halide having a critical temperature at least as high as the melting point of the chosen metal product in a spontaneous self-sustaining reaction flame; drastically chilling the reaction chamber walls; producing and maintaining a self-healing, insulating lining of predominantly metal product sponge on the drastically chilled walls of the reaction chamber; further impinging and collecting the reaction products upon the metal product sponge lining; separating the collecting reaction products into two immiscible, molten films flowing on the metal product sponge lining, the lower film being pure, liquid metal product and the upper film being liquid reducing agent halide; maintaining the temperature of the innermost surface of the two-component, molten, flowing film at least as high as the melting point of the reducing agent halide; freezing the flowing film of pure, liquid, metal product on the reaction chamber walls at a point remote from the reaction flame; producing and maintaining relative separational movement between the reaction flame and the freezing film of pure liquid metal product to produce a continuous, homogeneous, cast shape of pure metal product.

2. The method of producing pure refractory metals selected from the group consisting of titanium, hafnium, vanadium, silicon, zirconium, thorium, columbium, and chromium comprising the procedure in accordance with claim 1 and maintaining the partial pressure of the reducing agent halide impinging and collecting on the metal product sponge lining at least equal to its effective condensation vapor pressure at the ambient temperature adjacent to the reaction flame.

3. The method of producing pure refractory metals selected from the group consisting of titanium, hafnium, vanadium, silicon, zirconium, thorium, columbium, and chromium comprising the procedure in accordance with claim 1 and producing and maintaining an atmosphere in and about the reaction flame of predominantly gaseous reducing agent and gaseous metal product halide in equilibrium with respectively liquid reducing agent and liquid metal product halide at the ambient temperature and pressure, with relatively small quantities of gaseous reaction products in equilibrium with liquid reaction products, and gaseous intermediate reaction products in equilibrium with liquid intermediate reaction products; and maintaining the partial pressure of the impure reducing agent halide impinging and collecting on the metal product sponge lining at least equal to its effective condensation vapor pressure at the ambient temperature adjacent to the reaction flame.

4. The method of producing pure refractory metals selected from the group consisting of titanium, hafnium, vanadium, silicon, zirconium, thorium, columbium, and chromium comprising the procedure in accordance with claim 1, and reacting unreacted reducing agent with metal product subhalide by-products in the two-component, molten flowing film of reaction products before freezing the metal product.

5. The method of producing pure refractory metals selected from the group consisting of titanium, hafnium, vanadium, silicon, zirconium, thorium, columbium, and chromium comprising the procedure in accordance with claim 1 and gravitationally discharging from the reaction chamber liquid reducing agent halide derived from the film of molten reducing agent halide flowing over the inner surface of the solid, homogeneous, cast shape of pure metal product.

6. The method of producing pure refractory metals selected from the group consisting of titanium, hafnium, vanadium, silicon, zirconium, thorium, columbium, and chromium comprising the procedure in accordance with claim 1 and withdrawing the reaction flame upwardly in the reaction chamber as the reaction proceeds thereby producing the said relative separational movement between the reaction flame and the freezing film of pure liquid metal product.

7. The method of producing pure refractory metals selected from the group consisting of titanium, hafnium, vanadium, silicon, zirconium, thorium, columbium, and chromium comprising the procedure in accordance with claim 1 and withdrawing the metal product sponge lining and overlying solid, homogenous cast shape of pure metal product downwardly as the reaction proceeds thereby producing the said relative separational movement between the reaction flame and the freezing film of pure liquid metal product.

References Cited in the file of this patent

UNITED STATES PATENTS

| | | |
|---|---|---|
| 2,782,116 | Spedding et al. | Feb. 19, 1957 |
| 2,817,585 | Winter | Dec. 24, 1957 |
| 2,828,199 | Findlay | Mar. 25, 1958 |
| 2,941,867 | Maurer | June 21, 1960 |

FOREIGN PATENTS

| | | |
|---|---|---|
| 736,852 | Great Britain | Sept. 14, 1955 |